(No Model.) 2 Sheets—Sheet 1.
W. L. BROWNE.
TROLLEY CATCHER FOR ELECTRIC CARS.
No. 460,942. Patented Oct. 13, 1891.
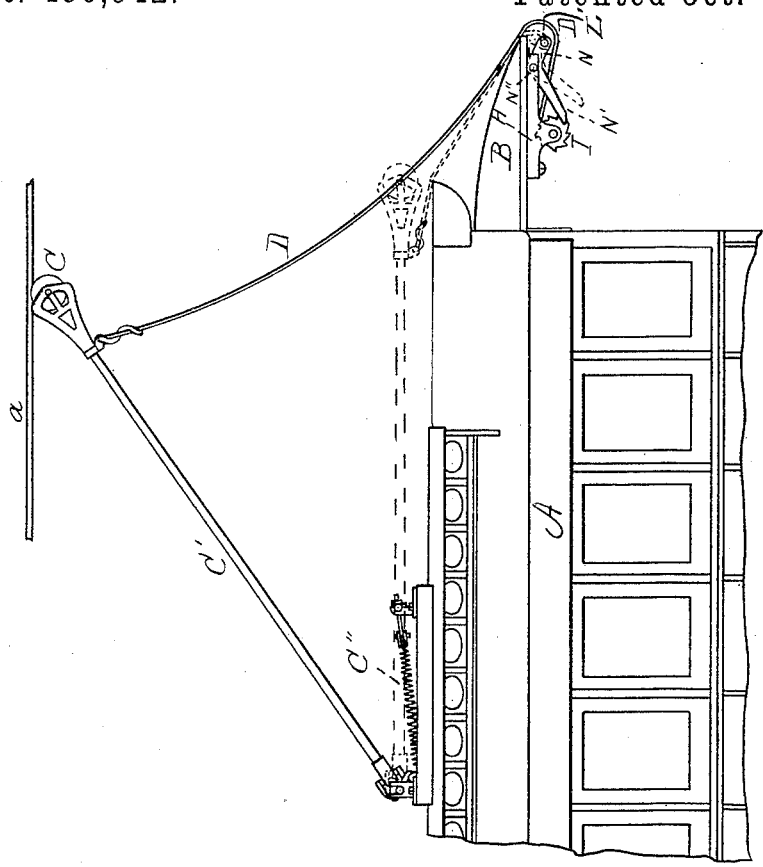
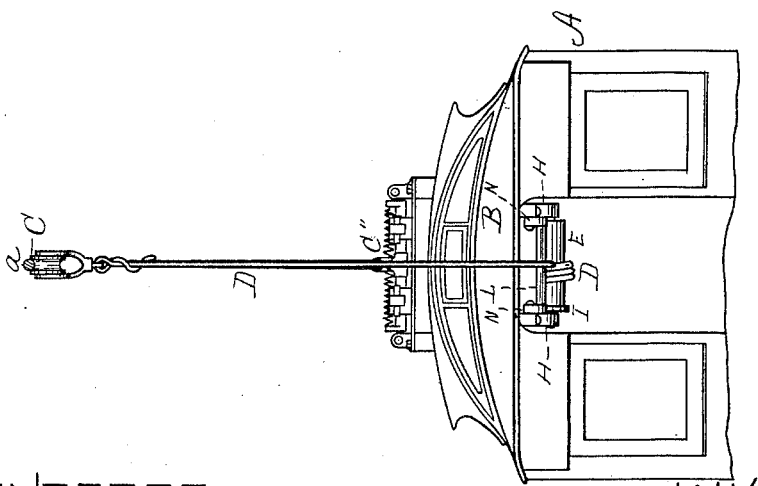
WITNESSES.
J. M. Hartnett,
A. C. Williams
INVENTOR.
William L. Browne
By his Atty.
Henry W. Williams (No Model.) 2 Sheets—Sheet 2.
W. L. BROWNE.
TROLLEY CATCHER FOR ELECTRIC CARS.
No. 460,942. Patented Oct. 13, 1891.
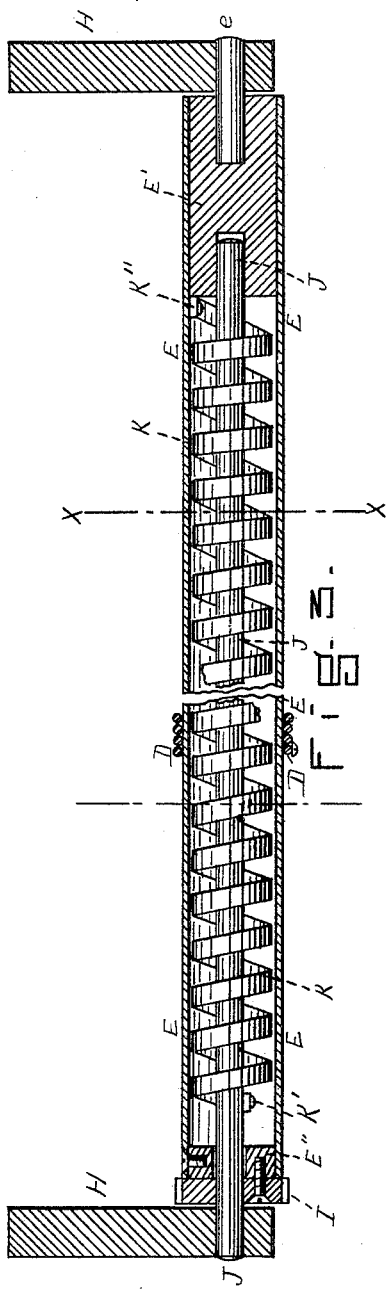
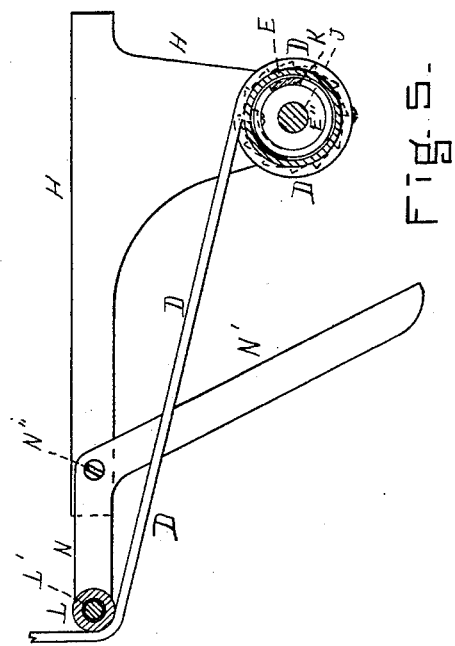
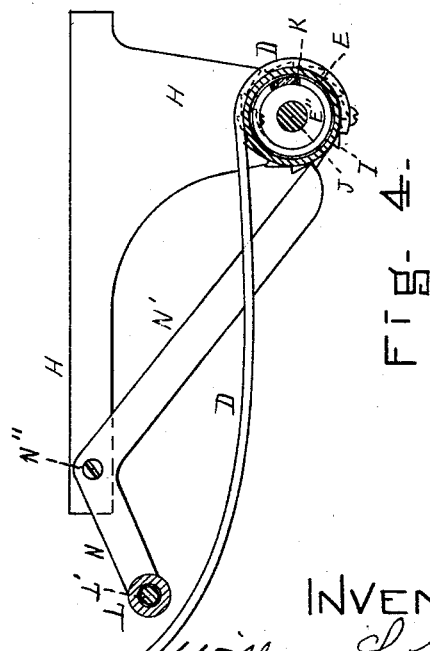
WITNESSES.
INVENTOR.

UNITED STATES PATENT OFFICE.

WILLIAM L. BROWNE, OF BOSTON, MASSACHUSETTS, ASSIGNOR OF ONE-HALF TO GEORGE E. COSTELLO, OF SAME PLACE.

TROLLEY-CATCHER FOR ELECTRIC CARS.

SPECIFICATION forming part of Letters Patent No. 460,942, dated October 13, 1891.

Application filed June 26, 1891. Serial No. 397,596. (No model.)

*To all whom it may concern:*

Be it known that I, WILLIAM L. BROWNE, of Boston, in the county of Suffolk and State of Massachusetts, have invented a new and useful Improvement in Electric Cars, of which the following is a specification.

This invention relates to that class of electric cars in which a trolley is employed for conveying the electricity to the motor. It is found in practice that the trolley not infrequently leaves the wire while the car is in motion, and flying up by the power of the spring which is connected with the trolley-pole strikes the guard-wire, damaging sometimes the guard-wire, sometimes the trolley itself, oftentimes the trolley-pole and the mechanism for connecting it with the car, and even seriously injuring the roof of the car, and in some cases tearing it from the car-body.

This improvement has for its object to prevent the trolley from rising when it accidentally leaves the wire, and hence prevent it from catching in or striking the guard-wire; and the nature of the device consists in the mechanism below described secured under the hood of the car, whereby when the trolley accidentally leaves the wire it will instantly be pulled down, so that it cannot become entangled in the guard-wire or other object to its injury or the injury of the car.

In the accompanying drawings, in which similar letters of reference indicate like parts, Figure 1 is a side elevation of a portion of an electric car provided with my improvement. Fig. 2 is an end elevation of the same. Fig. 3 is an enlarged longitudinal vertical section of my device detached from the car. Fig. 4 is a cross-section on line $x$, Fig. 3, with the device in the position assumed when the trolley is in place against the wire. Fig. 5 is a cross-section on the line $x$, Fig. 3, with the device in the position assumed when the trolley has accidentally left the wire and is being pulled down toward the car.

A represents the car-body, provided with the ordinary hood B at its end projecting over the platform.

C is the trolley, supported by the trolley-pole C', constructed in the ordinary manner, and held up against the power-wire $a$ by the spring C''.

D is the rope or cord by means of which the trolley is secured to the car and raised and lowered therefrom. The usual method is to secure the lower end of the cord D either to the hood or the dash-board of the car, allowing considerable slack. If the trolley leaves the wire it immediately flies up and strikes the guard-wire, doing the damage above mentioned. In this improvement I secure the lower end of the cord D to the barrel or cylinder E. This cylinder is supported between two brackets H, which are secured to the under side of the hood B near its outer edge. One end of the cylinder is provided with the plug E', from which a shaft $e$ extends to one of the brackets H, which forms its bearing. The wall E'' at the other end of the cylinder has rigidly attached to its outer end a ratchet-wheel I.

J is a spindle, one end of which is rigidly secured in one of the brackets H and the other end has its bearing in the plug E', said spindle extending loosely through the ratchet-wheel I and wall E'', and centrally through the cylinder, as shown.

A spiral spring K lies within the cylinder and around the spindle, one end being secured at K' to the spindle and the other end being secured at K'' to the inside of the cylinder.

L is a roller supported on shaft L', which is sustained at its opposite ends by hangers N, pivoted at N'' to the brackets H. One of these hangers N extends at N' into an elbow, which forms a pawl which engages the ratchet-wheel I. These hangers are so located as to bring the roller L to or a little beyond the edge of the hood B.

The operation is as follows: When the trolley is in its position against the wire, the pawl N' is in the position shown in Figs. 1 and 4— *i. e.*, in engagement with the ratchet-wheel I— and the cord D has just enough slack to avoid contact with the roller L. Now, if the trolley should accidentally leave the wire $a$ the upward movement imparted to it by the spring C'' would draw the cord D against the roller L, lifting the arm N and disengaging the pawl N' from the ratchet-wheel I, as shown in Fig. 5. The spring K then instantly rotates the cylinder E, which rapidly winds around it the cord D, which pulls the trolley down over the car, where it can create no damage. Thus it will be seen that when the trolley leaves the wire its slight upward movement instantly causes the cord to pull it down into a safe position.

A minor advantage is, that from the nature of the device the cord hangs high with very little slack, so that it is out of reach of careless or mischievous persons.

Having thus fully described my invention, what I claim, and desire to secure by Letters Patent, is—

The combination, with the hood B and trolley-cord D, of the spring-winding mechanism comprising the cylinder E, spindle J, spring K, and ratchet-wheel I, all supported by the brackets H, and the roller L, pivotally supported by the hangers N, one of which is provided with the ratchet-lever N', substantially as described.

WILLIAM L. BROWNE.

Witnesses:
HENRY W. WILLIAMS,
A. C. WILLIAMS.